United States Patent [19]

Ryan et al.

[11] Patent Number: 5,552,788
[45] Date of Patent: Sep. 3, 1996

[54] ANTENNA ARRANGEMENT AND AIRCRAFT COLLISION AVOIDANCE SYSTEM

[75] Inventors: Paul A. Ryan, Dublin; Dean E. Ryan, Columbus, both of Ohio

[73] Assignee: Ryan International Corporation, Columbus, Ohio

[21] Appl. No.: 497,714

[22] Filed: Jun. 30, 1995

[51] Int. Cl.$^6$ ................................................. G01S 13/00
[52] U.S. Cl. ............................ 342/30; 342/360; 342/362; 342/455
[58] Field of Search ............................ 342/30, 455, 360, 342/362

[56] References Cited

U.S. PATENT DOCUMENTS

| | | | |
|---|---|---|---|
| Re. 29,260 | 6/1977 | Litchford | 343/16 R |
| 3,087,151 | 4/1963 | Vantine, Jr. | 342/30 |
| 3,563,651 | 2/1971 | Alvarez et al. | 356/4 |
| 3,757,324 | 9/1973 | Litchford | 343/6.5 R |
| 3,792,472 | 2/1974 | Payne et al. | 343/6.51 LC |
| 3,808,598 | 4/1974 | Carter | 343/112 TC |
| 3,849,782 | 11/1974 | Bond | 343/112 CA |
| 3,858,210 | 12/1974 | Litchford | 343/11 R |
| 3,858,211 | 12/1974 | Litchford | 343/16 R |
| 3,895,382 | 7/1975 | Litchford | 343/6.5 LC |
| 3,921,172 | 11/1975 | Litchford | 343/16 R |
| 4,027,307 | 5/1977 | Litchford | 343/16 R |
| 4,128,839 | 12/1978 | McComas | 343/112 CA |
| 4,161,729 | 7/1979 | Schneider | 343/6.5 R |
| 4,380,050 | 4/1983 | Tanner | 364/461 |
| 4,486,755 | 12/1984 | Hulland et al. | 343/6.5 LC |
| 4,733,241 | 3/1988 | Litchford et al. | 342/453 |
| 4,768,036 | 8/1988 | Litchford et al. | 342/455 |
| 4,782,450 | 11/1988 | Flax | 364/461 |
| 4,789,865 | 12/1988 | Litchford | 342/455 |
| 4,855,748 | 8/1989 | Brandao et al. | 342/455 |
| 5,077,673 | 12/1991 | Brodegard et al. | 342/455 |
| 5,157,615 | 10/1992 | Brodegard et al. | 342/455 |
| 5,173,861 | 12/1992 | Inselberg et al. | 342/455 |
| 5,196,855 | 3/1993 | Kuroda | 342/453 |
| 5,220,329 | 6/1993 | Verbeke et al. | 342/455 |
| 5,223,847 | 6/1993 | Minter | 342/417 |
| 5,235,336 | 8/1993 | Sturm et al. | 342/30 |
| 5,280,285 | 1/1994 | Curtis et al. | 342/453 |
| 5,295,071 | 3/1994 | Kuzma et al. | 364/420 |
| 5,319,553 | 6/1994 | Gregg et al. | 364/420 |
| 5,325,302 | 6/1994 | Izidon et al. | 364/461 |
| 5,381,140 | 1/1995 | Kuroda et al. | 364/420 |

*Primary Examiner*—J. Woodrow Eldred
*Attorney, Agent, or Firm*—Pollock, Vande Sande & Priddy

[57] ABSTRACT

An antenna arrangement on a host aircraft for generating power signals related to a direction from which a transponder reply signal is received from a threat aircraft. The arrangement includes first and second monopole antenna elements arranged along a first axis of the host aircraft, third and fourth monopole antenna elements arranged along a second axis of the host aircraft, with the second axis being orthogonal to the first axis, a first quadrature combiner coupled to the first and second monopole antenna elements for generating first and second signals from the received reply signal, and a second quadrature combiner coupled to the third and fourth monopole antenna elements for generating third and fourth signals from the received reply signal. The respective power levels of the first, second, third and fourth signals are related to the direction from which the reply signal is received from the threat aircraft.

34 Claims, 14 Drawing Sheets

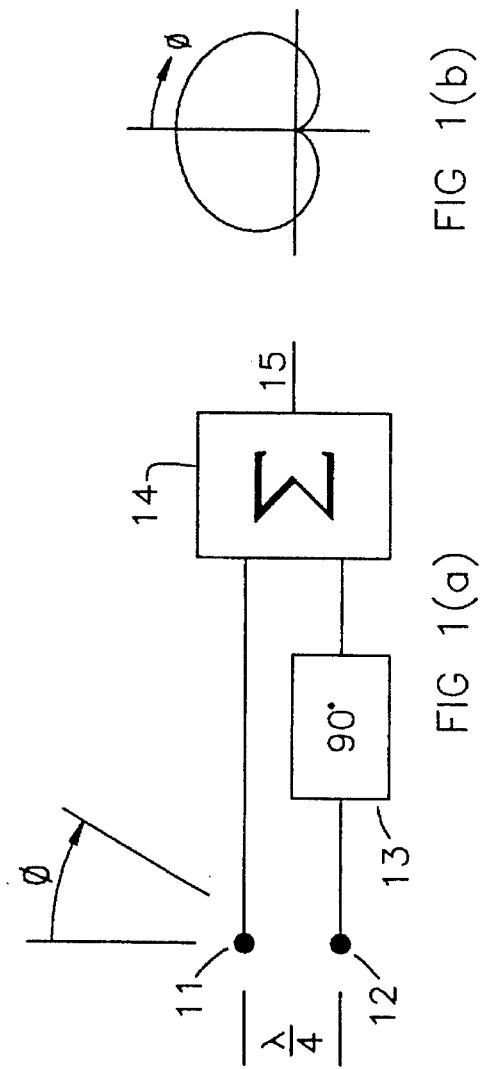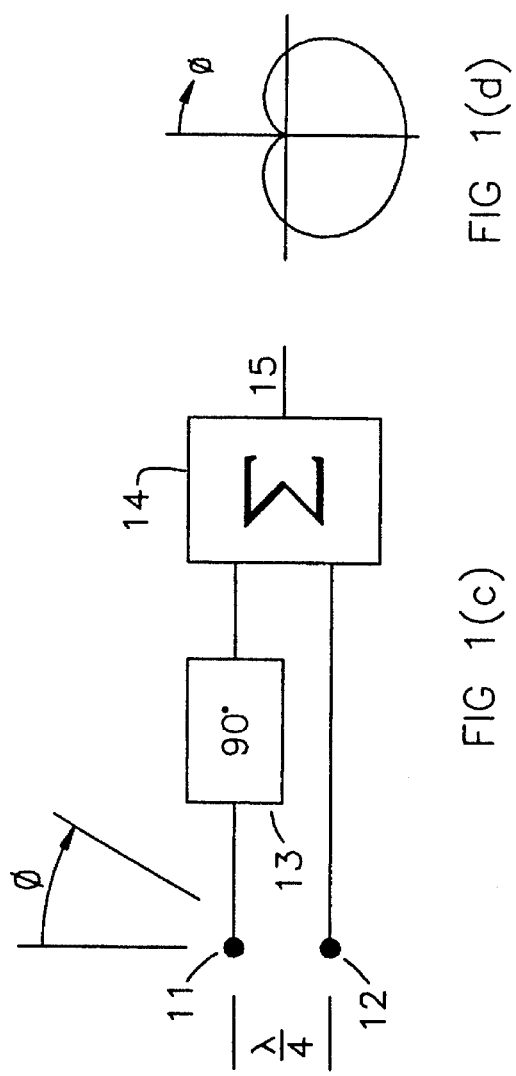

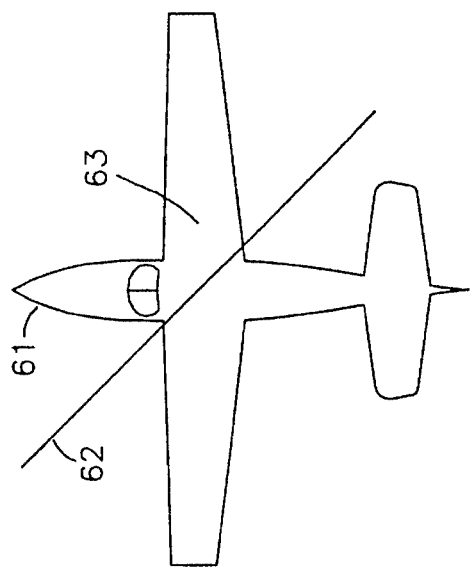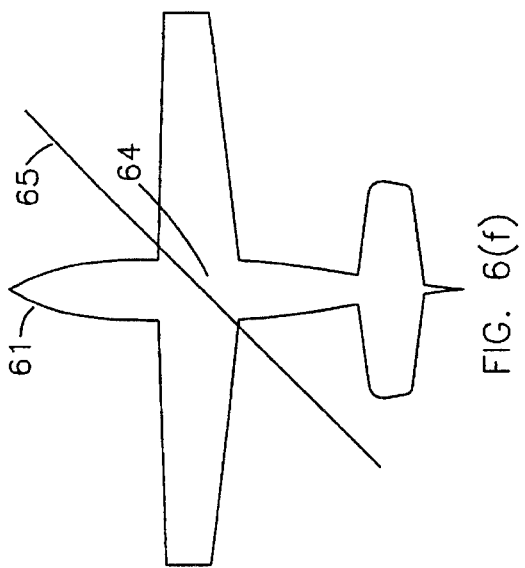

5,552,788

ANTENNA ARRANGEMENT AND AIRCRAFT COLLISION AVOIDANCE SYSTEM

BACKGROUND OF THE INVENTION

1. Field of the Invention

The present invention relates to an antenna arrangement. More particularly, the present invention relates to an antenna arrangement associated with an aircraft collision avoidance system on a host aircraft for determining a direction from which a transponder reply signal is received from threat aircraft.

2. Description of the Related Art

Almost all active aircraft are equipped with a transponder that, when interrogated, transmit reply signals having coded information relating to the aircraft associated with the transponder such as the altitude of the aircraft, for example. Transponder-based aircraft collision avoidance systems rely on transmitted reply signals from the existing population of airborne transponders for operation. By receiving coded transponder reply signals at a host aircraft that are transmitted from a threat aircraft, the altitude separation between the host aircraft and the threat aircraft can be determined and a safe altitude separation can be maintained between the two aircraft for avoiding a disastrous encounter. A transponder-based aircraft collision avoidance system is disclosed in U.S. Pat. No. 5,077,673 and U.S. Pat. No. 5,157,615, both issued to Brodegard et al., both of which are incorporated by reference herein.

The effectiveness of a collision avoidance system can be further enhanced by determining the approximate distance from a host aircraft to a threat aircraft based on the strength of a received transponder reply signal. Accurate ranging to a threat aircraft is accomplished by a host aircraft actively interrogating a threat aircraft, and then measuring the time between transmission of an interrogation signal and reception of a reply signal.

Although knowledge of the direction, or bearing, to a threat aircraft relative to the heading of a host aircraft is not essential to have collision avoidance, knowledge of the bearing to a threat aircraft greatly enhances a pilot's ability for visually acquiring the threat aircraft and for having a better spacial perspective of threat aircraft relative to the host aircraft.

Directional antennas are used in some transponder-based collision avoidance systems for determining bearing to a threat aircraft, but they are specialized and require complex circuitry for reliable operation. One common arrangement uses a quadrapole antenna array with output signals being combined so that the phase difference between two output ports of the combining circuitry are indicative of the bearing of a received transponder signal. This particular arrangement requires that the antenna cables be phase matched, and that the phase matching be maintained through two receiving channels of the system for accurate and reliable bearing determination. This requirement is both delicate and complex.

Another problem encountered with conventional aircraft collision avoidance systems using directional antenna is the location of the antenna on the airframe. Signals arriving at the antenna from directions that are "shadowed" by the airframe, that is, from directions which place the transmitter out of the line of sight from the antenna by virtue of the airframe blocking the antenna from the transmitter, are attenuated. Shadowing is presently overcome by placing a primary directional antenna on a top surface of the aircraft and a second antenna on a bottom surface of the aircraft. The bottom mounted antenna is usually omnidirectional. While using a single directional antenna reduces cost, it only does so at the expense of reduced directional coverage. To compensate for this drawback, the bottom antenna can be a duplicate of the top mounted directional antenna, but use of two directional antennas adds considerable cost and complexity to the aircraft collision avoidance system.

SUMMARY OF THE INVENTION

The antenna arrangement of the present invention uses standard off-the-shelf monopole antenna elements available from a plurality of sources. By using readily available antenna elements, cost and availability are substantially improved. Preferably, the antenna elements are commonly available ¼-wavelength transponder antennas arranged in an antenna array that is split between two locations on an aircraft, preferably the top and the bottom of the aircraft. By placing part of the antenna array on top of the aircraft and part on the bottom of the aircraft, airframe shadowing does not result in complete loss of bearing of a threat aircraft. Further, installation is simplified.

Additionally, the reception circuitry of the present invention is significantly simplified, and provides a virtually instantaneous measurement of bearing and better overall performance than conventional aircraft collision avoidance systems in determining bearing from all directions. This is because, after antenna signals are combined, phase shift is not critical from that point forward in the system through the aircraft since only signal magnitudes are utilized for determining bearing. Further, the present invention provides an aircraft collision avoidance system which can transmit transponder interrogation signals directionally thus eliminating dependence on ground-based radar systems for interrogating threat aircraft transponders.

The present invention provides an antenna arrangement on a host aircraft for generating signals related to a direction from which a transponder reply signal is received from a threat aircraft. The arrangement of one embodiment includes first and second monopole antenna elements arranged along a first axis of the host aircraft for receiving the reply signal, third and fourth monopole antenna elements arranged along a second axis of the host aircraft for receiving the reply signal with the second axis being orthogonal to the first axis, a first quadrature combiner coupled to the first and second monopole antenna elements for generating first and second signals from the received reply signal with respective power levels of the first and second signals being related to the direction from which the reply signal is received from the threat aircraft, and a second quadrature combiner coupled to the third and fourth monopole antenna elements for generating third and fourth signals from the received reply signal with respective power levels of the third and fourth signals being related to the direction from which the reply signal is received from the threat aircraft. Preferably, the first axis is a longitudinal axis of the host aircraft, the second axis is a lateral axis of the host aircraft, the first and second monopole antenna elements are located on a top surface of the host aircraft, and the third and fourth monopole antenna elements are located on a bottom surface of the host aircraft. The first axis can also be oriented 45° from a longitudinal axis of the host aircraft. The first and second quadrature combiners are each preferably a quadrature hybrid circuit. At least one of the pairs of monopole antenna elements and the corresponding quadrature combiner can be fabricated as a single unit for minimizing phase matching considerations.

One embodiment of the antenna arrangement of the present invention includes a receiver system coupled to the first and second quadrature combiners for respectively generating first, second, third and fourth video signals from the first, second, third and fourth signals, respectively, with the first, second, third and fourth video signals each having an amplitude related to the direction from the host aircraft to the threat aircraft from which the reply signal is received. Analog-to-digital converters receive each of the video signals for generating corresponding digital signals representing amplitudes of the video signals. A first comparator compares two of the digital signals for generating a first polarity bit signal. A second comparator compares the other two digital signals for generating a second polarity bit signal. A first difference circuit generates a first difference signal from the first and second video signals. A second difference circuit generates a second difference signal from the third and fourth video signals. A processor with a memory containing a look-up table receives the first and second difference signals and the polarity bit signals for generating a bearing signal related to the direction from which the reply signal is received from the threat aircraft. The present invention can also include a transmitter system coupled to the first and second quadrature combiners for transmitting a directional transponder interrogation signal.

The present invention also provides a method for determining a bearing of a transponder reply signal received from a threat aircraft with respect to a heading of a host aircraft. According to an embodiment of the invention, the host aircraft includes first and second monopole antenna elements arranged along a first axis of the host aircraft, third and fourth monopole antenna elements arranged along a second axis of the host aircraft with the second axis being orthogonal to the first axis. The method includes the steps of receiving the reply signal at the first, second, third and fourth monopole antenna elements, generating first, second, third and fourth received signals with the first, second, third and fourth received signals related to the reply signal received at the first, second, third and fourth monopole antenna elements, respectively, generating first and second signals from a quadrature summation of the first and second received signals such that the first signal corresponds to an antenna pattern in a first direction along the first axis of the host aircraft, and such that the second signal corresponds to an antenna pattern in a second direction along the first axis of the host aircraft, generating third and fourth signals from a quadrature summation of the third and fourth received signals such that the third signal corresponds to an antenna pattern of a first direction along the second axis of the host aircraft, and such that the fourth signal corresponds to an antenna pattern of a second direction along the second axis of the host aircraft, generating first, second, third and fourth video signals from the first, second, third and fourth signals, respectively, such that the first, second, third and fourth video signals each have an amplitude related to a bearing of the reply signal received from the threat aircraft with respect to the heading of a host aircraft. Preferably, the first axis is a longitudinal axis of the host aircraft, the first direction along the first axis is in a forward direction of the host aircraft and the second direction along the first axis is in an aft direction of the host aircraft, and the second axis is a lateral axis of the host aircraft, the first direction along the second axis is in a right direction of the host aircraft and the second direction along the second axis is in a left direction of the host aircraft. Also, the first, second, third and fourth video signals are converted to first, second, third and fourth digital signals, respectively, such that the first, second, third and fourth digital signals each represent an amplitude of the first, second, third and fourth video signals, respectively. The first and second digital signals are compared to each other for generating a first polarity bit signal. Similarly, the third and fourth digital signals are compared to each other for generating a second polarity bit signal. A first difference signal is generated from the first and second digital signals and a second digital signal is generated from the third and fourth digital signals. The bearing signal is generated based on the first and second difference signals and the first and second polarity bits such that the bearing signal is related to a bearing of the reply signal received from the threat aircraft with respect to the heading of a host aircraft. The transponder interrogation signal can be coupled to the first and second quadrature combiners for transmitting a directional transponder interrogation signal from the first, second, third and fourth monopole antenna elements.

BRIEF DESCRIPTION OF THE DRAWINGS

The present invention is illustrated by way of example and not limitation in the accompanying figures in which like reference numerals indicate similar elements and in which:

FIGS. 1(a)–1(d) show two arrangements of pairs of ¼ wavelength monopole antenna elements and their corresponding antenna field patterns with quadrature summation;

FIGS. 6(e) and 6(f) show two pairs of monopole antenna elements mounted on an aircraft with an alternate orientation of orthogonal axis according to the present invention;

DETAILED DESCRIPTION OF THE PREFERRED EMBODIMENTS

Figure 2:
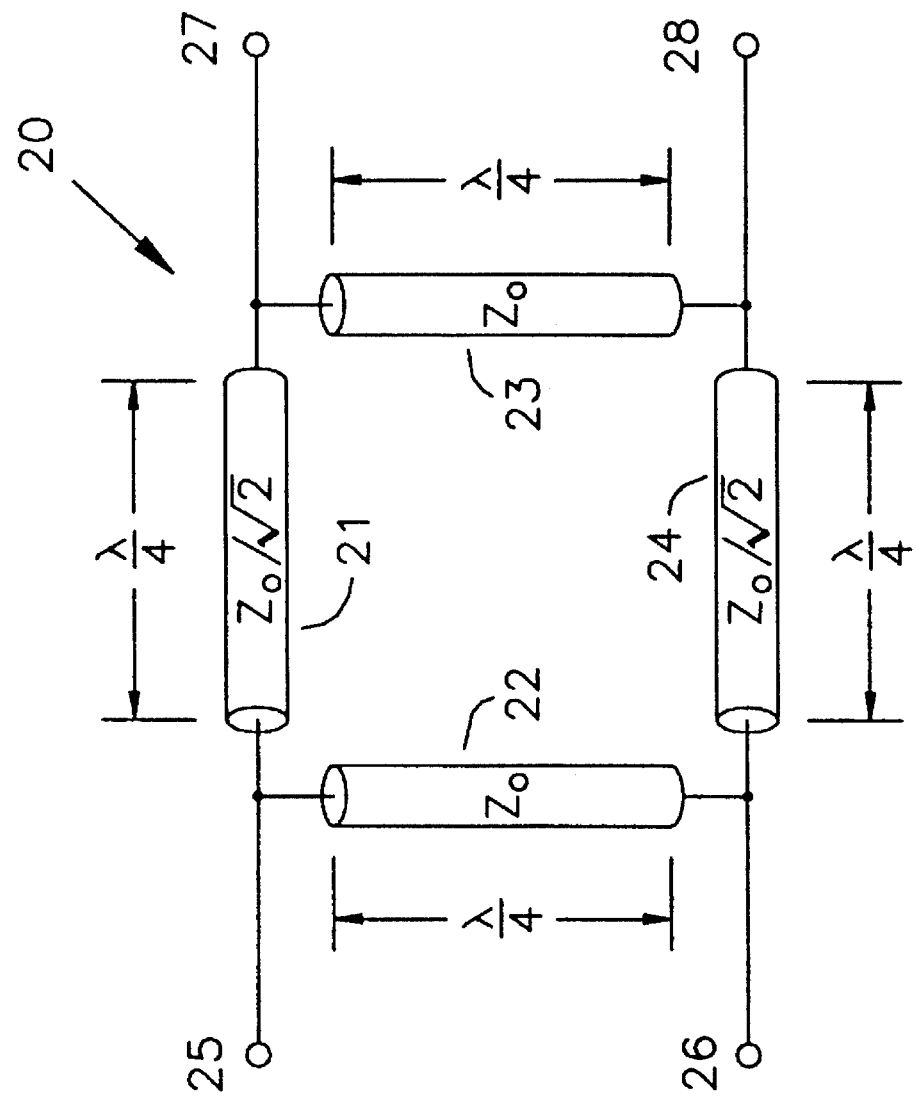
FIG. 2 shows a schematic block diagram of a quadrature hybrid circuit.

The present invention is directed to an antenna arrangement and an aircraft collision avoidance system that use two pairs of monopole antenna elements for determining a bearing of a threat aircraft with respect to a heading of a host aircraft.

FIG. 1(a) shows a top view of two ¼-wavelength monopole antenna elements 11 and 12 mounted on an infinite ground plane and separated by a ¼ wavelength spacing. If the signal received by monopole element 12 is phase shifted 90° by phase shifter 13 and summed with the received signal of monopole element 11 by combiner 14, the unidirectional field pattern shown in FIG. 1(b) is produced at the combiner output 15 (no mutual coupling). The azimuth $\phi$ of the received signal with respect to the axis on which antenna elements 11 and 12 are aligned is represented in both FIGS. 1(a) and 1(b). FIGS. 1(c) and 1(d) respectively show the situation where the signal received by monopole element 11 is phase shifted 90° before summation with the received signal of element 12 and the resulting unidirectional field pattern produced at combiner output 15. The bearing or azimuth of the received signal with respect to the axis on which antenna elements 11 and 12 are aligned is represented by $\phi$.

FIG. 2 shows a schematic block diagram of a quadrature hybrid circuit 20 utilized by the present invention in connection with an arrangement of monopole antenna elements for producing the field patterns of FIGS. 1(b) and 1(d). A quadrature hybrid circuit, also known as a branch-line hybrid or a hybrid ring, is a 3 dB directional coupler having a 90° phase difference between the outputs of the through and the coupled arms of the hybrid. It is well-known that a quadrature hybrid circuit can be used either as a power divider or as a power combiner. As shown in FIG. 2, a quadrature hybrid circuit has four quarter-wave transmission lines 21–24 coupled together in a well-known manner. Each port 25–28 of hybrid circuit 20 is terminated with a characteristic impedance $Z_0$ (not shown) and the output ports 27 and 28 have the property of being isolated from each other.

Figure 3:
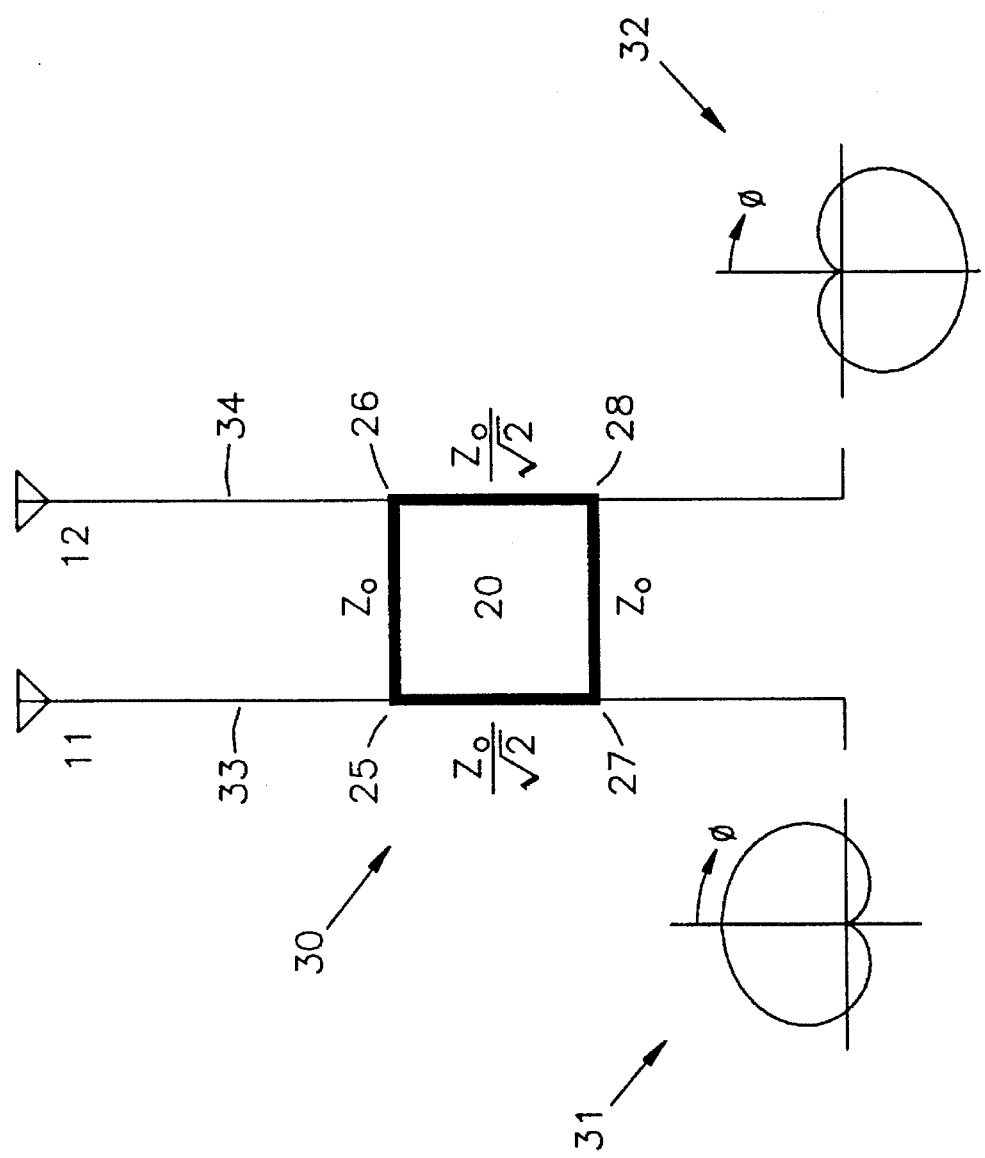
FIG. 3 shows a circuit arrangement of two monopole antenna elements and a quadrature hybrid circuit for forming two unidirectional antenna field patterns.

If a single monopole antenna element is connected to input port 25, the output signal power appearing at both ports 27 and 28 resulting from the input to port 25 will be equal and will have a 90° phase difference between port 27 and port 28. Since input port 25 and isolated port 26 are interchangeable, a monopole antenna element connected to isolated port 26 will similarly cause the output signal power appearing at both output ports 27 and 28 to be equal and have a 90° phase difference. When a monopole antenna element is connected to both input ports 25 and 26, two field patterns corresponding to those shown in FIGS. 1(b) and 1(d) are simultaneously generated by superposition. FIG. 3 shows a circuit arrangement 30 of two monopole antenna elements 11 and 12 and a quadrature hybrid circuit 20 for forming two unidirectional antenna field patterns 31 and 32.

Figure 4:
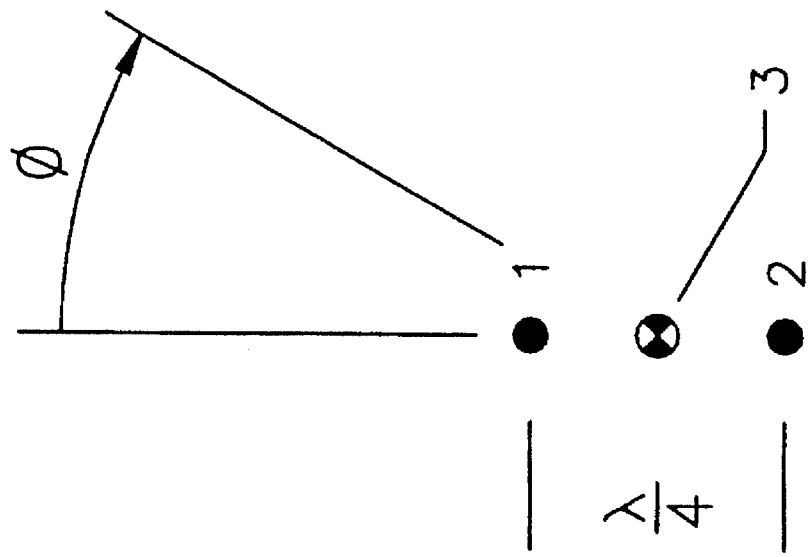
FIG. 4 shows a pair of ¼ wavelength monopole antenna elements spaced ¼ wavelength apart and mounted on an infinite ground plane.

FIG. 4 shows a pair of ¼ wavelength monopole antenna elements 1 and 2 spaced ¼ wavelength apart and mounted on an infinite ground plane. The following equations describing the antenna patterns of the present invention are normalized to an antenna pattern for a single ¼-wavelength monopole antenna mounted on an infinite ground plane. Only the equatorial-plane (horizontal-plane) patterns are considered and the various potentials described are with respect to a phase center 3, that is, halfway between antenna elements 1 and 2.

Since 1 wavelength equal $2\pi$ radians, the electrical potentials of the monopole elements in phasor notation are:

$$E_1 = 1.0 \angle (\pi/4) \cos \phi \quad (1)$$

$$E_2 = 1.0 \angle -(\pi/4) \cos \quad (2)$$

where, $E_1$ and $E_2$ are the electrical potentials of monopole elements 1 and 2, respectively, with respect to phase center 3. These two potentials are combined using a quadrature hybrid (FIG. 2) with the phase of $E_2$ shifted an additional 90° (see FIG. 1(a)) to give, $$E_T = [1/(2)^{1/2}](E_1 + E_2/90°) \quad (3)$$

The coefficient $1/(2)^{1/2}$ is a result of the antenna power being divided equally between the two outputs ports of the adrature hybrid. An equation similar to Equation (3) can be written for the situation where the phase of $E_1$ is shifted an additional 90° (see FIG. 1(c)).

Expanding Equation (3) into real and imaginary parts, $$e_T = \{½^{1/2}\}\{\cos[(\pi/4)\cos \phi] + \sin[(\pi/4)\cos \phi]\} + j\{½^{1/2}\}\{\cos[(\pi/4)\cos \phi] + \sin[(\pi/4)\cos \phi]\} \quad (4)$$

Simplifying Equation (4) yields, $$|E_T| = |\cos[(\pi/4)\cos \phi] + \sin[(\pi/4) \cos \phi]| \quad (5)$$

Figure 5:
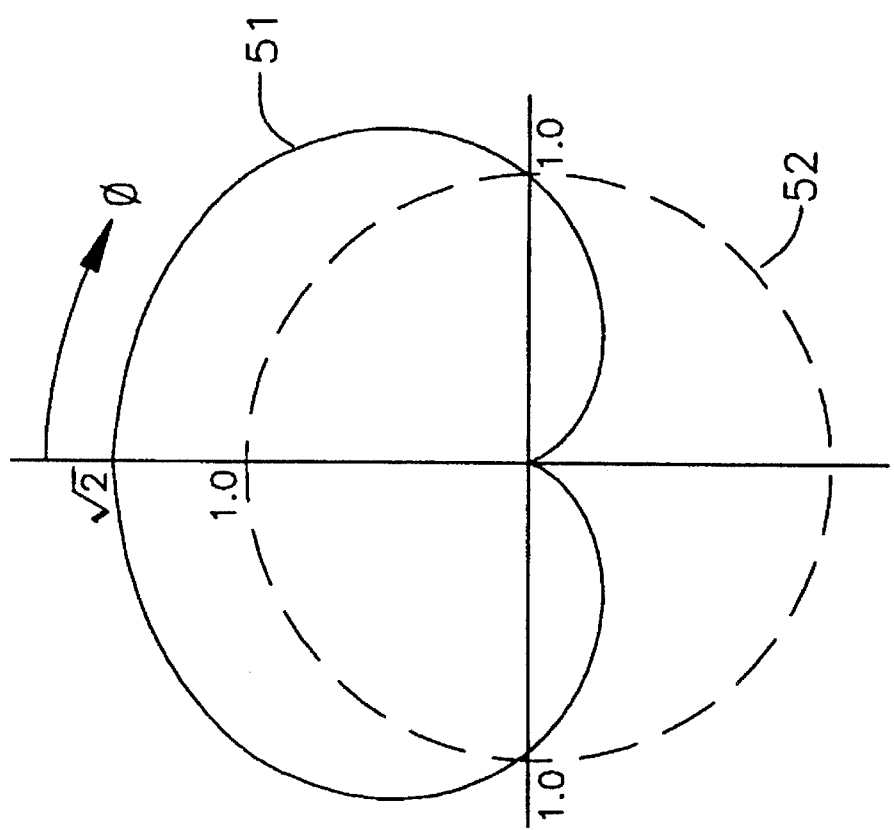
FIG. 5 shows a field intensity pattern for a pair of monopole antenna elements, after being combined by a quadrature hybrid, and for a single monopole antenna element.

Equations (3) and (4) are for the electric field pattern of a pair of monopole antenna elements referenced to a single monopole antenna element. A polar plot 51 of Equation (5) is shown in FIG. 5 superimposed on a polar plot 52 of a single monopole antenna element. As shown in FIG. 5, the maximum electric field intensity for two monopole antenna elements is $2^{1/2}$ times greater than the intensity of a single monopole antenna element. Thus, the resulting power gain for the two monopole antenna elements is two (referenced to a single monopole element), and the half-power beam width is 180°.

Figure 6B:
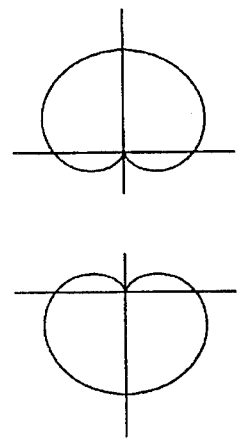
FIGS. 6(a)–6(d) show two pairs of monopole antenna elements mounted on an aircraft and the corresponding antenna field patterns for each pair of antenna elements according to the present invention.
Figure 6D:
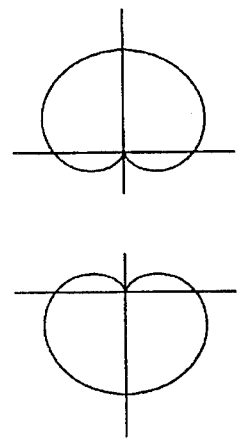
Figure 6A:
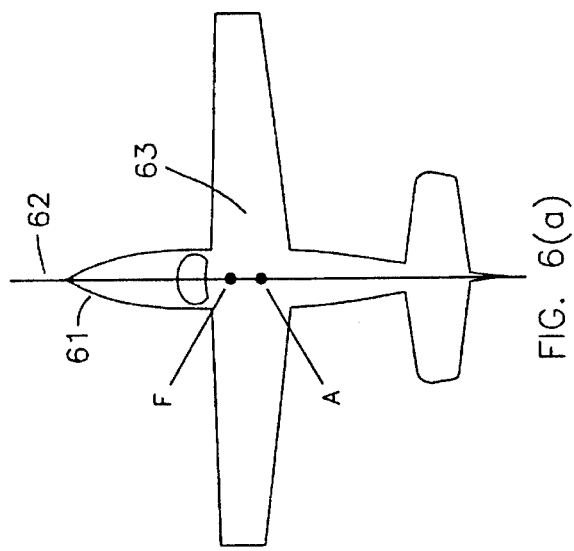
Figure 6C:
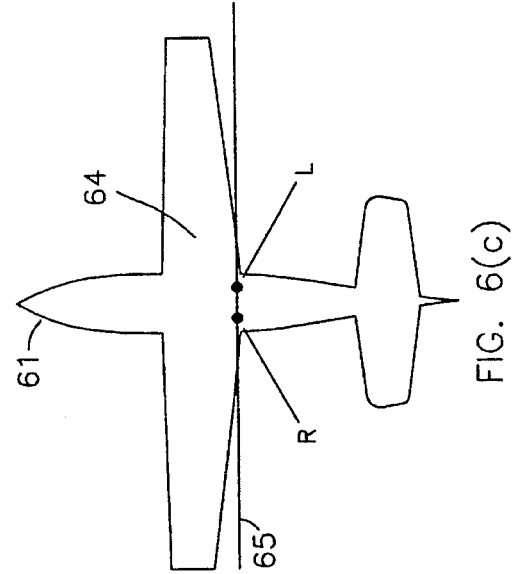

FIGS. 6(a)–6(d) show two pairs of monopole antenna elements mounted on an aircraft and the corresponding antenna field patterns for each pair of antenna elements. FIG. 6(a) shows a first pair of monopole elements F and A that are preferably mounted on a top surface 63 of an aircraft 61 and aligned along a reference axis 62. In FIG. 6(a), reference axis 62 is aligned along a longitudinal axis of aircraft 61. Element F is the forward-most antenna element of the first monopole pair, while element A is the aft-most antenna element of the pair. FIG. 6(c) shows a second pair of monopole elements R and L that are preferably mounted on a bottom surface 64 of aircraft 61 and aligned along a second axis 65 that is orthogonal to reference axis 62. In FIG. 6(c), the second axis 65 is parallel to an axis extending from wing tip to wing tip of aircraft 61. Element R is the right-most antenna element of the second monopole pair, while element L is the left-most antenna element of the pair (referenced to the aircraft in an upright attitude). The first and second pairs of monopole elements can be interchanged, that is, elements F and A can be mounted on the bottom surface 64 of aircraft 61, while elements R and L can be mounted on the top surface 63 of the aircraft. Further, the axis along which the two pairs of antenna elements are aligned can be oriented at another angle relative to the heading of the host aircraft, for example, oriented 45° from the longitudinal axis shown in FIGS. 6(a) and 6(c). In such an arrangement, as shown in FIGS. 6(e) and 6(f) for example, the processing arrangement coupled to the pairs of antenna elements will need to account for the alternative orientation of the orthogonally arranged axes on which the antenna element pairs are aligned.

FIG. 6(b) shows the antenna field patterns for elements F and A when they are coupled to a quadrature hybrid circuit in the manner shown in FIG. 3. FIG. 6(d) shows similar antenna field patterns for monopole elements R and L when coupled to a quadrature hybrid circuit.

Referring to FIG. 3, the transmission lines 33 and 34 connecting monopole antenna elements 11 and 12 to quadrature hybrid circuit 20 must be phase matched according to the present invention, but cable lengths beyond the outputs of hybrid 20 are not critical with respect to phase considerations because only signal magnitudes are used by the present invention for determining bearing of a received reply signal, and not phase relationships. By mounting hybrid circuit 20 close to monopole elements 11 and 12, the cable connections between elements 11 and 12 and hybrid circuit 20 will be short and will, accordingly, not be difficult to phase match and/or calibrate for removing any phase mismatch. To further reduce the complexity of the present invention, quadrature hybrid circuit 20 can be fabricated as a single unit with a pair of monopole antenna elements, thus minimizing any phase matching required by the present invention prior to combiner 20. In FIG. 3, this would be achieved by fabricating elements 11 and 12 to connect directly to ports 25 and 26, respectively, of hybrid circuit 20 omitting lines 33 and 34.

Figure 7:
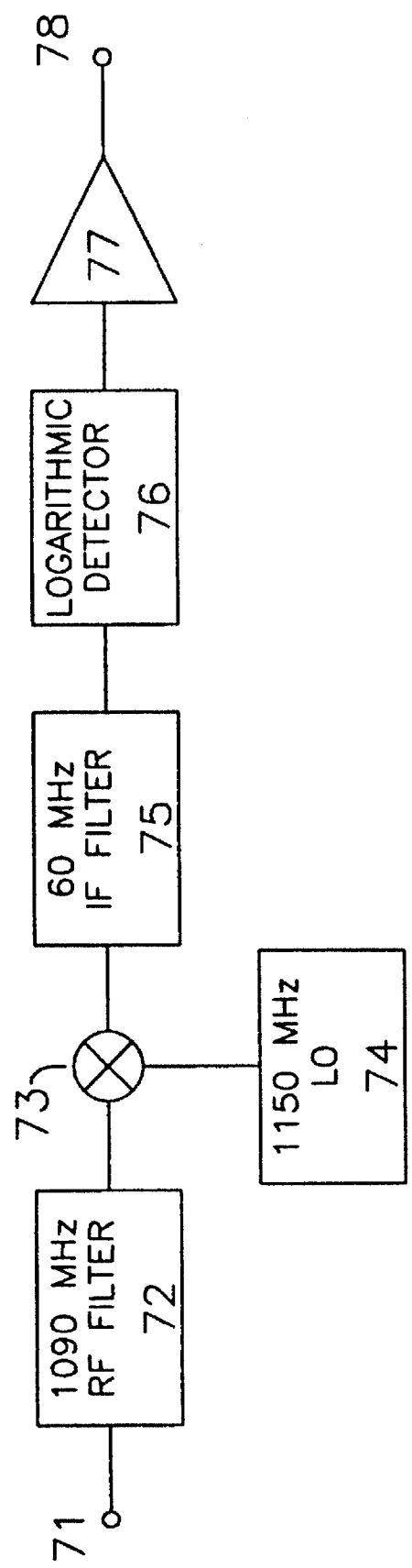
FIG. 7 shows a schematic block diagram of a single receiver channel for an aircraft collision avoidance system according to the present invention.

FIG. 7 shows a schematic block diagram of a single receiver channel 70 for an aircraft collision avoidance system according to the invention. Preferably, the present invention includes four receiver channels configured like single receiver channel 70, that is, one for each field pattern, but fewer receiver channels can be used by storing information and switching. However, by using fewer than four receiver channels, the system loses the ability to perform instantaneous bearing measurements. Preferably, four separate and identical receivers are used, one for each channel, so that bearing of a received transponder reply signal can be measured during each separately received pulse. Typically transponder replies include pulses having a 450 nanosecond duration. Since the receivers themselves do not require phase tracking according to the present invention, and since normal gain variations between receivers cause no more than an acceptable level of error, four identical receiver channels are not difficult or costly to fabricate or maintain.

Receiver channel 70 is a conventional receiver channel. Input port 71 is coupled to one of the output ports 27 and 28 of a quadrature hybrid circuit 20. The output signal of the hybrid circuit is filtered by bandpass filter 72 that has an RF center frequency of 1090 MHz, for example. The output of filter 72 is coupled to a first input of mixer 73. A local oscillator signal from local oscillator (LO) 74 is coupled to a second input of mixer 73 for down-converting the filtered antenna signal to an intermediate frequency (IF) signal. The down-convertered output of mixer 73 is coupled to an IF filter 75 that has a center frequency of 60 MHz, for example. The output of IF filter 75 is coupled to a logarithmic detector 76 for producing a video signal. The logarithmic detector permits operation of the system over a wider dynamic range than a linear detector. The video output of detector 76 is amplified by video amplifier 77 and output at channel output 78.

Local oscillator 74 can be common to all four channels of the collision avoidance system of the present invention for reducing the total number of functional elements of the system. While exemplary RF, LO, and IF frequencies are indicated, other frequencies can be readily used.

Figure 8A:
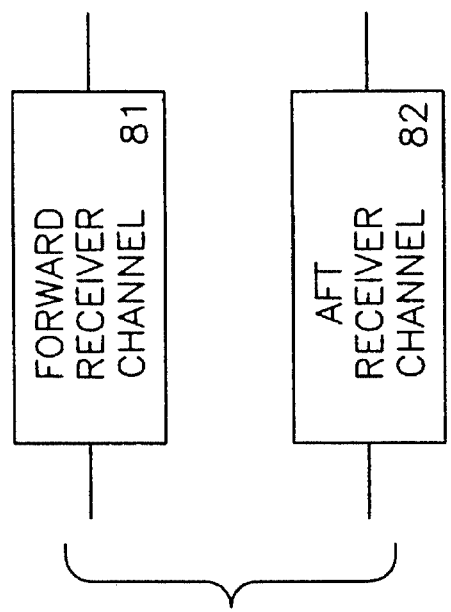
FIGS. 8(a) and 8(b) show the configuration of four receiver channels for producing antenna field patterns for measuring bearing according to the present invention.
Figure 8B:
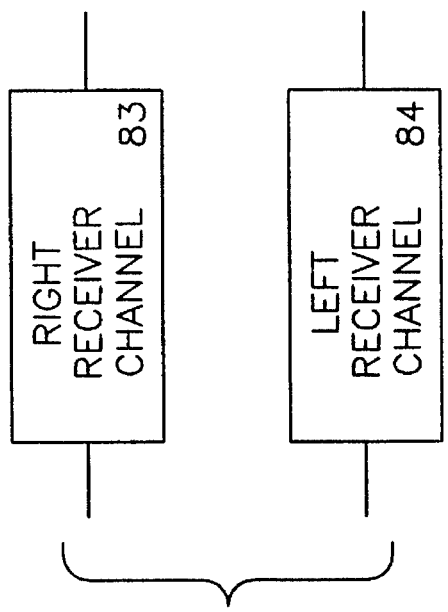

FIGS. 8(a) and 8(b) show an arrangement of four receiver channels 81–84 for producing video signals having amplitudes representing antenna field patterns for measuring bearing according to the present invention. The antenna field patterns shown have been conditioned by the logarithmic detectors of each receiver channel. Each of the receiver channels 81–84 can use the circuit of channel 70 although the LO 74 may be common to all four channels.

To determine the bearing of a received transponder reply signal the compressed logarithmic signal output from a receiver channel is normalized to unity, that is, the maximum signal level (minimum range) is set to 1. The compressed logarithmic output of a channel has the form:

$$(Compressed\ Log\ Output) = 1 + k \times Log(Normalized\ Input) \quad (6)$$

where, k is a constant.

Figure 9B:
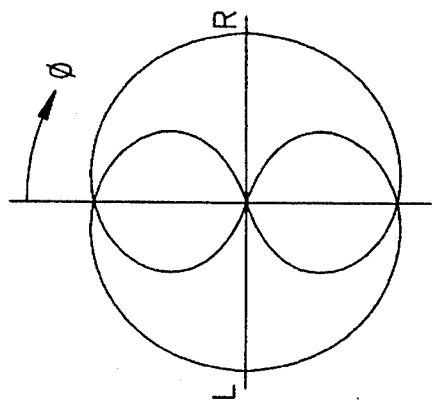
FIG. 9(a)–9(d) show normalized antenna field patterns for the antenna arrays of FIGS. 6(a) and 6(b) according to the present invention for maximum expected signal levels.
Figure 9D:
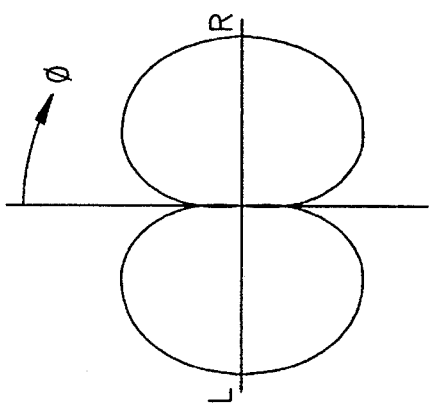
Figure 9A:
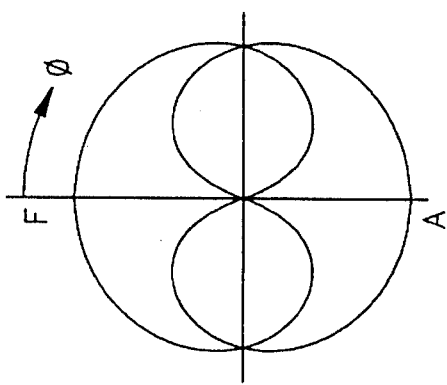
Figure 9C:
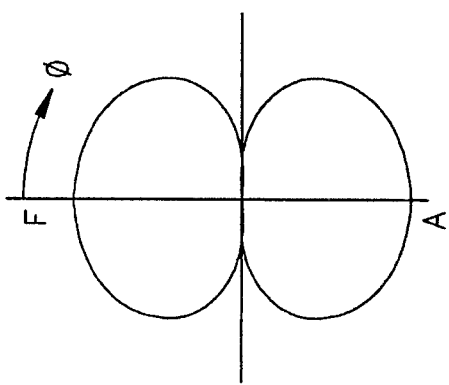

The only meaningful range of values for the compressed output is zero and above, so Equation (6) is only applicable for input values that satisfy this restriction. For all other input values, the compressed output is zero. The patterns of FIGS. 9(a)–9(d) illustrate the effects of logarithmic compression on the antenna patterns of the monopole arrays of the present invention. FIGS. 9(a) and 9(b) show normalized antenna patterns for the top and bottom monopole antenna arrays of FIGS. 6(a) and 6(c), respectively, for a maximum expected signal level. FIGS. 9(c) and 9(d) show normalized antenna field patterns for the top and bottom monopole antenna arrays of 6(a) and 6(c), respectively, for a minimum expected signal level. The azimuth φ of a received signal with respect to the axis on which a monopole pair is align is also shown in FIGS. 9(a)–9(d).

Since the patterns are non-linear due to logarithmic compression, pattern shape is a function of received signal amplitude. The polar patterns of FIGS. 9(a)–9(d) are based on a 25:1 dynamic range between the expected maximum and minimum range for the system of the present invention. It has been found that this is a very practical range of operation for collision avoidance applications.

Figure 10B:
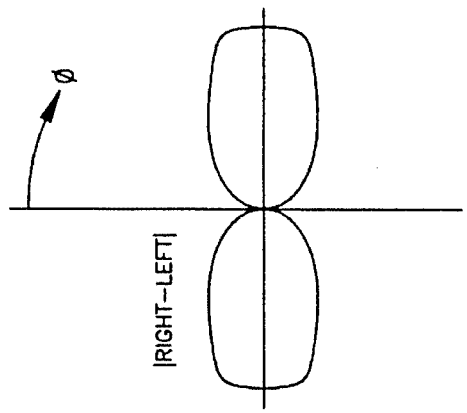
FIGS. 10(a)–10(d) show compressed difference patterns for the antenna patterns of FIGS. 9(a) and 9(d) according to the present invention.
Figure 10D:
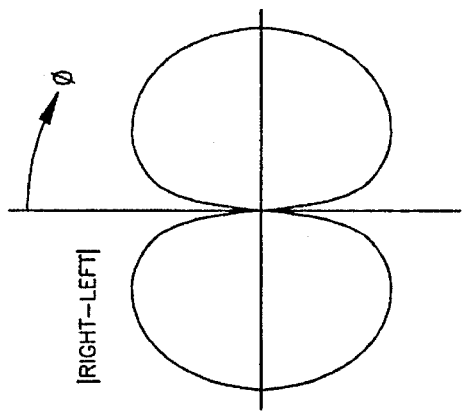
Figure 10A:
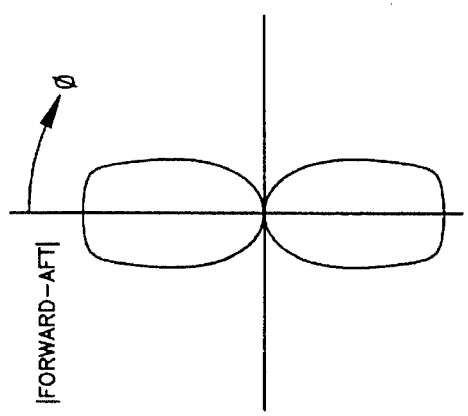
Figure 10C:
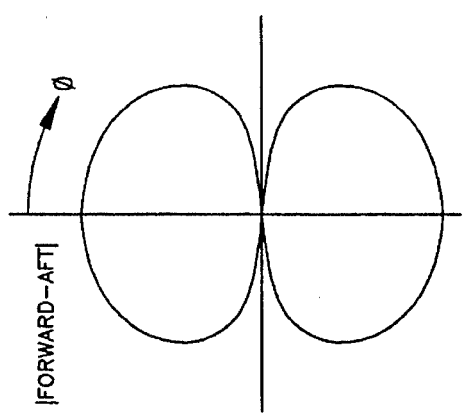

The logarithmic compressed patterns of FIGS. 9(a)–9(d) can be further combined for useful adaptation. By producing the difference between the forward F and aft A compression patterns, and the difference between the left L and right R compression patterns, and by further preserving magnitudes only, that is, absolute values, the four patterns are reduced to two patterns. These difference patterns have a "Bow Tie" shape, and are shown by FIGS. 10(a) and 10(b). Since the difference patterns are also non-linear because of the logarithmic compression, the pattern shape is a function of signal amplitude. Again, the patterns shown in FIGS. 10(a)–10(d) are for the end limits of the 25:1 dynamic range of operation.

The logarithmic compressed signals from the four receiver channels are digitized using analog-to-digital (A/D) converters for further processing. Quadrant determination can be made immediately from these four digitized signals. With the channels identified as F - Forward, A - Aft, R - Right, and L - Left, if F>A, the bearing of a received signal is within the forward two quadrants. If F<A, the bearing is within the aft two quadrants. If R>L, bearing is within the right two quadrants, and if R<L, bearing is within the left two quadrants. By generating two sign or polarity bits, one for the difference between Forward/Aft and the other for the difference between Right/Left, the quadrant of the bearing is distinguished. For example, if the two polarity bits are (+/+) (with the first bit designated for forward/aft and the second bit designated for right/left), then bearing of a received reply signal is within the first quadrant. If the two polarity bits are (–/+), then bearing is within the second quadrant. If the two polarity bits are (–/–), bearing is within the third quadrant, and if the polarity bits are (+/–), bearing is within the fourth quadrant.

The four digitized signals are also combined for forming a set of two difference signals. The first difference signal is the |F-A| signal representing the magnitude of the difference between the F-channel and the A-channel. The |R-L| signal represents the magnitude of the difference between the R-channel and the L-channel. This pair of difference channel signals, together with the two sign bits for quadrant identification, provide all necessary information for determining an accurate bearing. Since the patterns have mirror symmetry among the respective quadrants, determination of the bearing angle from a cardinal axis can be combined with quadrant awareness (polarity bits) for providing an unambiguous bearing angle.

Figure 11C:
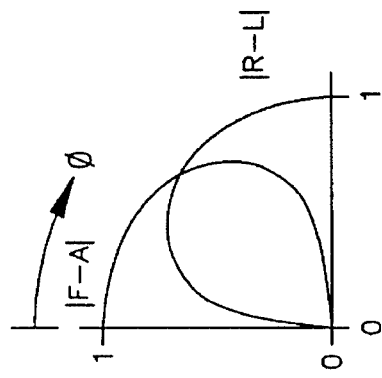
FIGS. 11(a)–11(d) show a first quadrant representation of |F-A| patterns superimposed on |R-L| patterns according to the present invention for maximum expected signal levels.
Figure 11D:
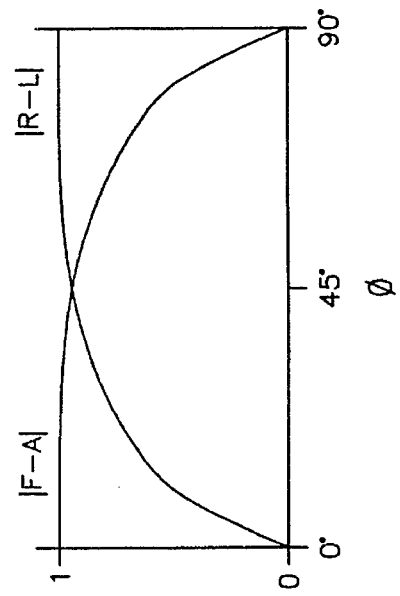
Figure 11A:
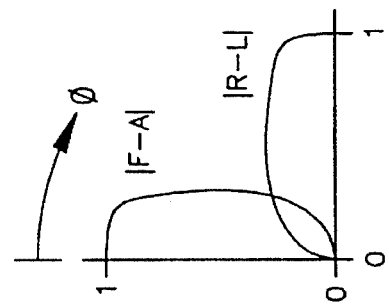
Figure 11B:
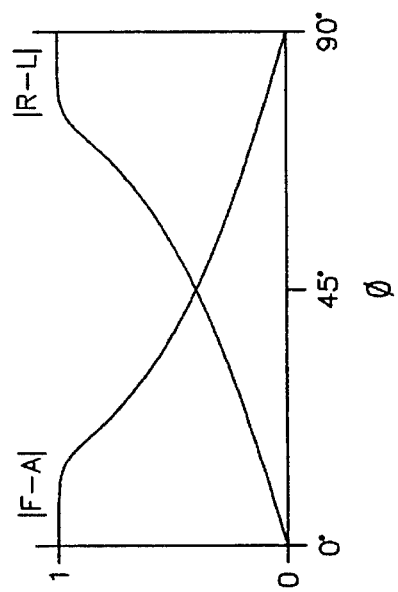

FIGS. 11(a)–11(d) show a first quadrant representations of the |F-A| patterns superimposed with the |R-L| patterns on the same polar and rectilinear graphs for maximum and minimum expected signal levels. FIGS. 11(a) and 11(b) show superimposed patterns for maximum expected signal levels and FIGS. 11(c) and 11(d) show superimposed patterns for minimum expected signal levels. The non-linear effects of compression are apparent from the graphic representations of FIGS. 11(a)–11(d).

Direct mathematical solutions for the transcendental equations relating the digitized values of a received reply signal to a bearing angle from which the reply signal is received are not straightforward. Iterative algorithms are well-known within the computer arts for solving equations that have no simple converse solutions. Iterative algorithm computer programs can readily calculate the bearing angle and total signal magnitude for determining the bearing angle solution for every pair of digitized values of |F-A| and |R-L|.

Iterative solutions, however, are inherently slow. Depending upon the desired accuracy of a solution, the number of iterations for reaching a single solution can be prohibitively long. To overcome this drawback, the present invention preferably uses a look-up table stored in a memory for determining the bearing of a received transponder reply signal. The look-up table contains the bearing angle solutions to all possible combinations of digitized values to a practical resolution. Thus, bearing angle solutions are computed nearly instantaneously by merely accessing the look-up table stored in the memory in a well-known manner using the pair of magnitudes |F-A| and |R-L| along with the polarity bits.

The instantaneous nature of bearing acquisition according to the present invention is of great benefit for collision avoidance, as well as other related applications. When receiving transponder reply signals, each reply consists of short multiple pulses in sequence. The present invention is capable of determining bearing for each such short pulse. Consequently, there is an abundance of repetitive bearing information generated by the present invention which allows for rapid updates and refinements in threat aircraft bearing information.

Figure 12:
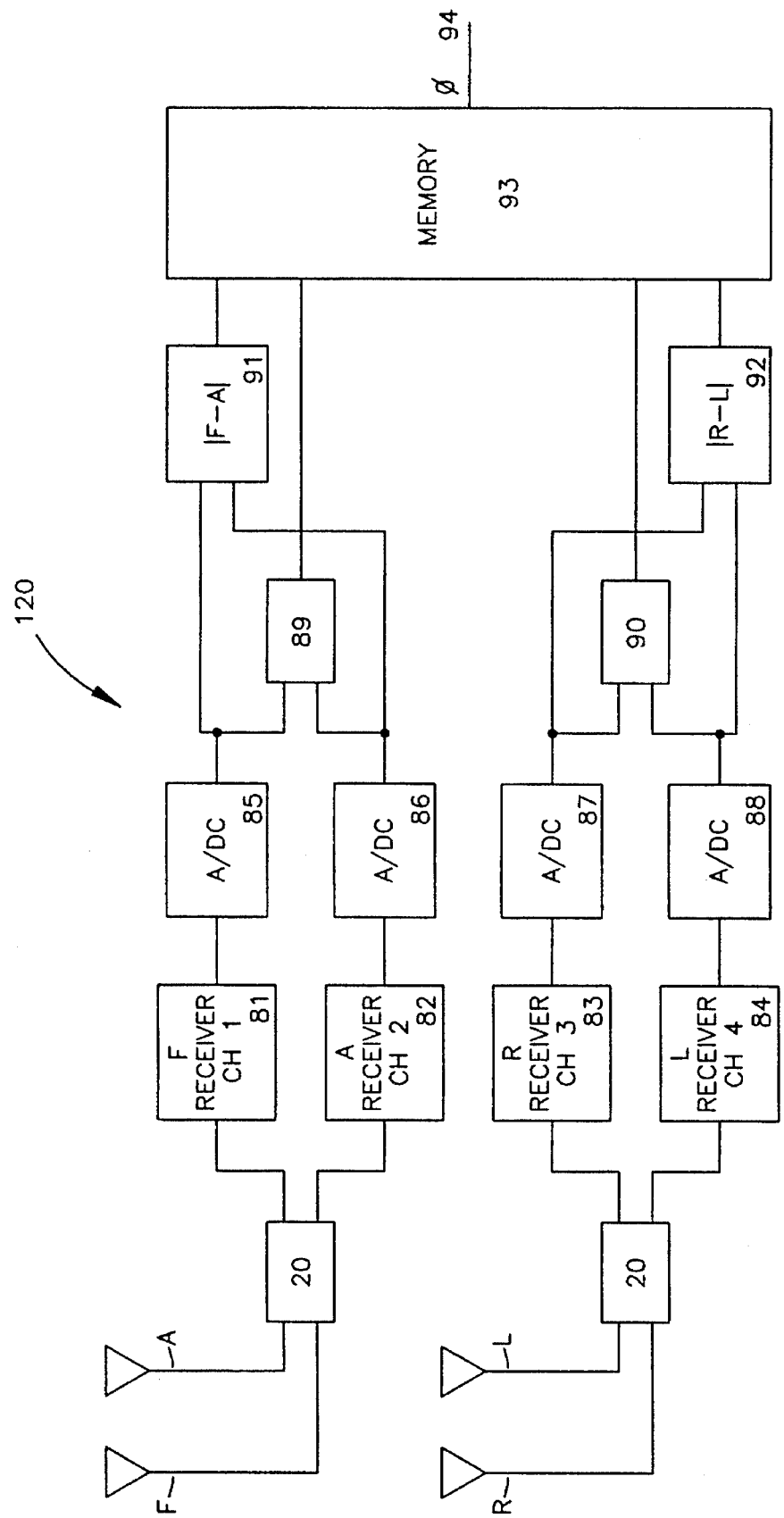
FIG. 12 shows a processing arrangement according to the present invention for generating a bearing information signal from field patterns signals.

FIG. 12 shows a processing system arrangement 120 according to the present invention for generating bearing information from received transponder reply signals. The four logarithmically compressed output signals of receiver channels 81–84 (FIG. 8) are coupled to A/D converters 85–88, respectively, for generating digitized signals from the compressed output signals. The outputs of A/D converters 85 and 86 are compared by comparator 89 for determining the F/A polarity bit. Similarly, the outputs of A/D converters 87 and 88 are compared by comparator 90 for determining the R/L polarity bit.

The outputs of A/D converters 85 and 86 are input to |F-A| generator 91 for generating a signal representing the magnitude of the difference between the forward-channel and the aft-channel of the system. The outputs of A/D converters 87 and 88 are input to |R-L| generator 92 for generating a signal representing the magnitude of the difference between the right-channel and the left-channel of the system. The respective outputs of comparators 89 and 90 and of the difference generators 91 and 92 are input to memory 93 where a bearing look-up table is stored. The polarity bits and the difference magnitudes applied to memory 93 cause memory 93 to generate bearing information in a well-known manner at output 94.

Converters 85–88, comparators 89 and 90, difference generators 91 and 92, and memory 93 can be embodied as well-known, readily available individual dedicated integrated circuits, or be a single application specific integrated circuit (ASIC). Further, the functions of the comparators and difference generators of the arrangement shown in FIG. 12 can be embodied by a microprocessor having sufficient speed for performing all of the necessary functions and calculations for generating the input signals for memory 93.

In FIG. 12, A/D converters 85–88 are shown digitizing the video signals output from the respective receivers 81–84. When processing system 120 is configured as shown in FIG. 12, A/D converters 85–88 convert the analog signals output from receivers 81–84 to digital signal as soon as possible in the signal path so that analog-type circuit design considerations, such as DC-offset and gain errors, are minimized.

Processing system 120 can also be configured with comparators 89 and 90 and difference generators 91 and 92 connected directly to the video outputs of receivers 81–84 with the outputs of the difference generators being converted to a digital signal by A/D converters. That is, comparator 89 and difference generator 91 can both be connected directly to the video outputs of receivers 81 and 82, and comparator 90 and difference generator 92 can both be connected directly to the video outputs of receivers 83 and 84. In this configuration, difference generators 91 and 92 would be required to generate difference signals by operating on the analog output signals output from receivers 81–84. A separate A/D converter would be connected to the respective outputs of the difference generators for producing digital signals. A processing system 120 configured in this manner would be similar to system 120 shown in FIG. 12, except A/D converters 85–88 would be omitted and separate A/D converters would be connected between difference generator 91 and memory 93 and difference generator 92 and memory 93.

As will be apparent to those skilled in the art, the signal processing described herein, comparing, differencing, the table look up etc. can be implemented by either discrete circuitry or a software driven processor. If the latter alternate is selected then the antenna signal processor may be the same processor which records reply signals and processes those signals as described in the patents cited above. On the other hand there may be reasons for using an antenna signal processor which is separate from the reply signal processor described in the cited patents.

The antenna array of the present invention (FIG. 6) has identical transmitting and receiving field patterns (antenna reciprocity theorem). Consequently, directional transmissions are achieved by selectively driving each of the four output ports of the quadrature hybrid circuits (two output ports 27 and 28 per each hybrid circuit 20), while terminating the other three ports that are isolated from the driven port in the characteristic impedance of the system. Typically, PIN diode switches are used for selecting the active (driven) port when transmitting. A duplexer can be used in a well-known manner for transmitting and receiving signals using a common antenna array.

Figure 13:
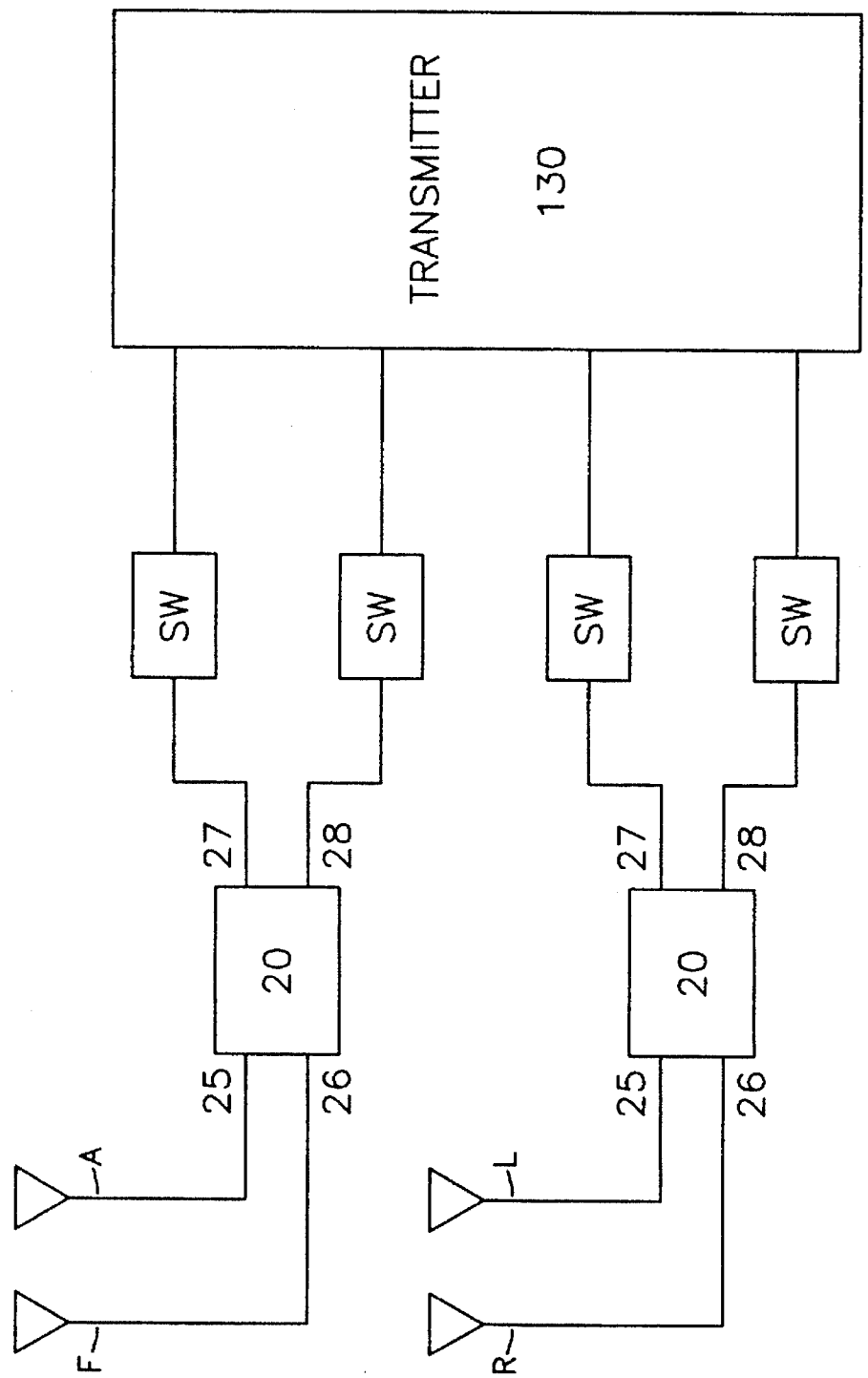
FIG. 13 shows a transmitter system coupled to the antenna arrangement of the present invention for transmitting a directional transponder interrogation signal.

FIG. 13 shows a transmitter system 130 which can be coupled in a well-known manner through switches SW to the output ports 27 and 28 of the quadrature hybrid circuits 20 of the present invention. Switches SW are preferably PIN diode switches. Transmitter system 130 generates a conventional transponder interrogation signal which is coupled to the monopole antenna elements array of the present invention for directionally transmitting the transponder interrogation signal. To transmit a directional signal, the amplitudes of the signals applied to the output ports 27 and 28 of the quadrature hybrid circuits need to be sequentially selected by switches SW in a well-known manner. The actual respective signal magnitudes for transmitting in a particular direction will be proportionally the same as the magnitudes of a signal received from the same direction.

By using the antenna array of the present invention for transmitting, threat aircraft transponders can be directionally interrogated without dependence on ground radar interrogations. By actively interrogating threat aircraft transponders, distances to threats can be measured accurately by measuring the time of arrival of a transponder reply signal after an interrogation signal is transmitted.

While the present invention has been described in connection with the illustrated embodiments, it will be appreciated and understood that modifications may be made without departing from the true spirit and scope of the invention.

What is claimed is:

1. An antenna arrangement on a host aircraft for generating signals related to a direction from which a transponder reply signal is received from a threat aircraft, the arrangement comprising:

a first monopole antenna element and a second monopole antenna element arranged along a first axis of the host aircraft for receiving the reply signal;

a third monopole antenna element and a fourth monopole antenna element arranged along a second axis of the host aircraft for receiving the reply signal, the second axis being orthogonal to the first axis;

a first quadrature combiner coupled to the first and second monopole antenna elements for generating first and second signals from the received reply signal, respective power levels of the first and second signals being related to the direction from which the reply signal is received from the threat aircraft; and a second quadrature combiner coupled to the third and fourth monopole antenna elements for generating third and fourth signals from the received reply signal, respective power levels of the third and fourth power signals being related to the direction from which the reply signal is received from the threat aircraft.

2. The antenna arrangement according to claim 1, wherein the first axis is a longitudinal axis of the host aircraft and the second axis is a lateral axis of the host aircraft.

3. The antenna arrangement according to claim 2, wherein the first and second monopole antenna elements are located on a first surface of the host aircraft, and third and fourth monopole antenna elements are located on a second surface of the host aircraft.

4. The antenna arrangement according to claim 3, wherein the first surface is a top surface of the host aircraft and the second surface is a bottom surface of the host aircraft.

5. The antenna arrangement according to claim 3, wherein the first surface is a bottom surface of the host aircraft and the second surface is a top surface of the host aircraft.

6. The antenna arrangement according to claim 1, wherein the first axis is oriented 45° from a longitudinal axis of the host aircraft.

7. The antenna arrangement according to claim 1, wherein the first and second quadrature combiners are each a quadrature hybrid circuit.

8. The antenna arrangement according to claim 7, further comprising a receiver system coupled to the first and second quadrature combiners for generating a bearing information signal from the first, second, third and fourth signals, the bearing information signal related to the direction from which the transponder reply signal is received from the threat aircraft.

9. The antenna arrangement according to claim 8, further comprising a transmitter system coupled to the first and second quadrature combiners for transmitting a transponder interrogation signal from the first, second, third and fourth monopole antenna elements.

10. The antenna arrangement according to claim 9, wherein the transponder interrogation signal is transmitted directionally from the first, second, third and fourth monopole antenna elements.

11. The antenna arrangement according to claim 7, wherein at least one of the first and second monopole antenna elements and the first quadrature combiner, and the third and fourth monopole antenna elements and the second quadrature combiner are a single unit.

12. An aircraft collision avoidance system on a host aircraft, the system comprising:

a first monopole antenna element and a second monopole antenna element arranged along a first axis of the host aircraft for receiving a transponder reply signal from a threat aircraft;

a third monopole antenna element and a fourth monopole antenna element arranged along a second axis of the host aircraft for receiving the reply signal, the second axis being orthogonal to the first axis;

a first quadrature combiner coupled to the first and second monopole antenna elements for generating first and second signals from the received reply signal, respective power levels of the first and second power signals being related to a direction from which the reply signal is received from the threat aircraft;

a second quadrature combiner coupled to the third and fourth monopole antenna elements for generating third and fourth signals from the received reply signal, respective power levels of the third and fourth power signals being related to the direction from which the reply signal is received from the threat aircraft; and a receiver coupled to the first and second quadrature combiners for generating first, second, third and fourth video signals from the first, second, third, and fourth signals, respectively, the first, second, third and fourth video signals each having an amplitude related to the direction from the host aircraft to the threat aircraft from which the reply signal is received.

13. The aircraft collision avoidance system according to claim 12, wherein the first axis is oriented 45° from a longitudinal axis of the host aircraft.

14. The aircraft collision avoidance system according to claim 12, wherein the first axis is a longitudinal axis of the host aircraft and the second axis is a lateral axis of the host aircraft.

15. The aircraft collision avoidance system according to claim 14 wherein the first and second monopole antenna elements are located on a first surface of the host aircraft, and the third and fourth monopole antenna elements are located on a second surface of the host aircraft.

16. The aircraft collision avoidance system according to claim 15, wherein the first surface is a top surface of the host aircraft and the second surface is a bottom surface of the host aircraft.

17. The aircraft collision avoidance system according to claim 15, wherein the first surface is a bottom surface of the host aircraft and the second surface is top surface of the host aircraft.

18. The aircraft collision avoidance system according to claim 15, wherein the first and second quadrature combiners are each a quadrature hybrid circuit.

19. The aircraft collision avoidance system according to claim 18, further comprising:

a first comparator responsive to the first and second video signals generating a first comparison signal;

a second comparator responsive to the third and fourth video signals generating a second comparison signal;

a first difference circuit responsive to the first and second video signals generating a first difference signal;

a second difference circuit responsive to the third and fourth video signals generating a second difference signal;

a memory loaded with data representing a table of bearing angles as a function of a pair of comparison signals and magnitudes of a pair of difference signals; and means for coupling the first and second comparison signals and the first and second difference signals to the memory.

20. The aircraft collision avoidance system according to claim 18, further comprising:

a first analog-to-digital converter responsive to the first video signal and producing a first digital signal, the first digital signal representing an amplitude of the first video signal;

a second analog-to-digital converter responsive to the second video signal and producing a second digital signal, the second digital signal representing an amplitude of the second video signal;

a third analog-to-digital converter responsive to the third video and producing a third digital signal, the third digital signal representing an amplitude of the third video signal;

a fourth analog-to-digital converter responsive to the fourth video signal and producing a fourth digital signal, the fourth digital signal representing an amplitude of the fourth video signal; and a processor for generating a bearing signal from the first, second, third and fourth digital signals, the bearing signal being related to the direction from which the reply signal is received from the threat aircraft.

21. The system according to claim 20, wherein the processor comprises:

a first comparator producing a one bit first polarity signal responsive to the first and second digital signals;

a second comparator producing a one bit second polarity signal responsive to the third and fourth digital signals;

a first digital difference circuit responsive to the first and second digital signals generating a first difference signal;

a second digital difference circuit responsive to the third and fourth digital signals generating a second difference signal;

a memory loaded with data representing a table of bearing angles as a function of a pair of polarity bits and a pair of difference signals; and means for coupling the first and second difference signals and the first and second polarity signals to the memory.

22. The aircraft collision avoidance system according to claim 12, further comprising a transmitter coupled to the first and second quadrature combiners for transmitting a transponder interrogation signal from the first, second, third and fourth monopole antenna elements.

23. The aircraft collision avoidance system according to claim 22, wherein the transponder interrogation signal is transmitted directionally from the first, second, third and fourth monopole antenna elements.

24. The aircraft collision avoidance system according to claim 12, wherein at least one of the first and second monopole antenna elements and the first quadrature combiner, and the third and fourth monopole antenna elements and the second quadrature combiner are a single unit.

25. A method for determining a bearing of a transponder reply signal received from a threat aircraft with respect to a heading of a host aircraft, the host aircraft including a first monopole antenna element and a second monopole antenna element arranged along a first axis of the host aircraft, a third monopole antenna element and a fourth monopole antenna element arranged along a second axis of the host aircraft, the second axis being orthogonal to the first axis, the method comprising the steps of:

receiving the reply signal at the first, second, third and fourth monopole antenna elements;

generating first, second, third and fourth received signals, the first, second, third and fourth received signals related to the reply signal received at the first, second, third and fourth monopole antenna elements, respectively;

generating first and second signals from a quadrature summation of the first and second received signals, the first signal corresponding to an antenna pattern in a first direction along the first axis of the host aircraft, and the second signal corresponding to an antenna pattern in a second direction along the first axis of the host aircraft;

generating third and fourth signals from a quadrature summation of the third and fourth received signals, the third signal corresponding to an antenna pattern of a first direction along the second axis of the host aircraft, and the fourth power level signal corresponding to an antenna pattern of a second direction along the second axis of the host aircraft;

generating first, second, third and fourth video signals from the first, second, third and fourth signals, respectively, the first, second, third and fourth video signals each having an amplitude related to a bearing of the reply signal received from the threat aircraft with respect to the heading of a host aircraft.

26. The method according to claim 25, wherein the first axis is oriented 45° from a longitudinal axis of the host aircraft.

27. The method according to claim 25, wherein the first axis is a longitudinal axis of the host aircraft, the first direction along the first axis is in a forward direction of the host aircraft, and the second direction along the first axis is in an aft direction of the host aircraft, and the second axis is lateral axis of the host aircraft, the first direction along the second axis is in a right direction of the host aircraft and the second direction along the second axis is in a left direction of the host aircraft.

28. The method according to claim 25 further comprising the steps of:

comparing the first and second video signals for generating a first polarity signal;

comparing the third and fourth video signals for generating a second polarity signal;

generating first difference signal based on a difference between the first and second video signals;

generating second difference signal based on a difference between the third and fourth video signal; and generating a bearing signal based on the first and second polarity signals and the first and second difference signals, the bearing signal related to a bearing of the reply signal received from the threat aircraft with respect to a heading of the host aircraft.

29. The method according to claim 25, further comprising the steps of:

converting the first, second, third and fourth video signals to first, second, third and fourth digital signals, respectively, the first, second, third and fourth digital signals each representing an amplitude of the first, second, third and fourth video signals, respectively;

comparing the first and second digital signals for generating a first polarity bit;

comparing the third and fourth digital signals for generating a second polarity bit;

generating a first difference signal based on a difference between the first and second digital signals;

generating a second difference signal based on a difference between the third and fourth digital signals; and generating a bearing signal based on the first and second polarity bits and the first and second difference signals, the bearing signal related to a bearing of the reply signal received from the threat aircraft with respect to the heading of the host aircraft.

30. The method according to claim 29, wherein the step of generating the bearing signal comprises the step of addressing bearing data stored in a look-up table in a memory.

31. The method according to claim 25, wherein the first and second monopole antenna elements are located on a top surface of the host aircraft.

32. The method according to claim 31, wherein the third and fourth monopole antenna elements are located on a bottom surface of the host aircraft.

33. The method according to claim 25, further comprising the steps of:

generating a transponder interrogation signal; and coupling the transponder interrogation signal to the first, second, third and fourth monopole antenna elements for transmitting the transponder interrogation signal.

34. The method according to claim 33, wherein the step of coupling the transponder interrogation signal to the first, second, third and fourth monopole antenna elements generates a directionally transmitted signal.

* * * * *